(No Model.)
H. SMITH.
TIRE FOR VEHICLE WHEELS.
No. 372,180. Patented Oct. 25, 1887.
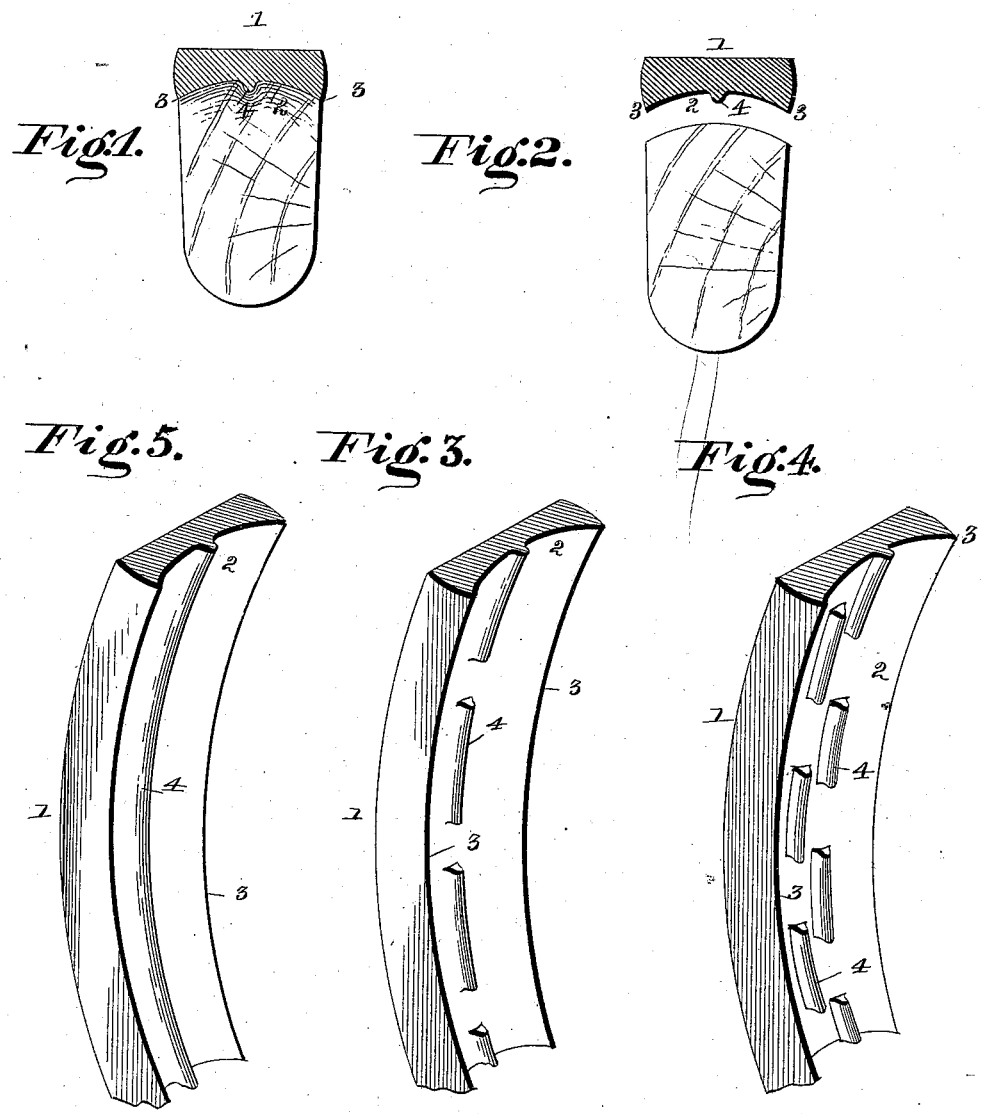
WITNESSES
F. L. Ourand
B. S. Cowl
Harry Smith,
INVENTOR
by Louis Bagger & Co.
Attorneys.

UNITED STATES PATENT OFFICE.

HARRY SMITH, OF EMMITTSBURG, MARYLAND.

TIRE FOR VEHICLE-WHEELS.

SPECIFICATION forming part of Letters Patent No. 372,180, dated October 25, 1887.

Application filed February 15, 1887. Serial No. 227,708. (No model.)

*To all whom it may concern:*

Be it known that I, HARRY SMITH, a citizen of the United States, and a resident of Emmittsburg, in the county of Frederick and State of Maryland, have invented certain new and useful Improvements in Tires for Vehicle-Wheels; and I do hereby declare that the following is a full, clear, and exact description of the invention, which will enable others skilled in the art to which it appertains to make and use the same, reference being had to the accompanying drawings, which form a part of this specification, and in which—

Figure 1 is a transverse sectional view of as much of the felly and tire of a vehicle-wheel as will illustrate my invention. Fig. 2 is a similar view of the felly and the tire before the tire is shrunk on the felly. Fig. 3 is a perspective view of a piece of one form of the tire, and Figs. 4 and 5 are similar views of pieces of other forms of tires.

Similar numerals of reference indicate corresponding parts in all the figures.

My invention has relation to that class of tires for vehicle-wheels in which the inner side of the tire is concaved and formed with flanges; and it consists in the improved construction and combination of parts of such a tire, in which the concaved inner side of the tire is formed with a series of ribs or lugs which will be forced into the face of the felly when the tire is shrunk upon the same, as hereinafter more fully described and claimed.

In the accompanying drawings, the numeral 1 indicates the tire, the inner face, 2, of which is concave, forming rounded ribs or flanges 3 at the edges of the tire, and the concave face is formed at its middle with a series of low longitudinal ribs, 4, which in shrinking the tire upon the felly may enter the face of the same, the ribbed concave face of the tire forcing itself into a fit upon the flat face of the felly as it is shrunk upon the same. It will be seen that the ribs and the raised edges or flanges at the edges of the tire will prevent the tire from slipping off sidewise from the felly, the ribs forming short grooves in the face of the felly as it shrinks upon the same, the fiber of the wood being displaced and forced in by the ribs.

Instead of having the ribs at the middle of the tire, as shown in the first three figures, they may be arranged as in Fig. 4, in which is shown a series of short ribs or longitudinal lugs placed alternately at the sides of the middle line of the tire; or the ribs may be made continuous and placed at the middle of the tire, as shown in Fig. 5.

Having thus described my invention, I claim and desire to secure by Letters Patent of the United States—

1. A tire for vehicle-wheels, the inner face of which is provided with a number of short longitudinal ribs or lugs having spaces between them.

2. The combination, with a vehicle-wheel, the outer face of the felly of which is smooth, of a tire the inner face of which is provided with a number of short ribs or lugs having spaces between them.

In testimony that I claim the foregoing as my own I have hereunto affixed my signature in presence of two witnesses.

HARRY SMITH.

Witnesses:
LOUIS BAGGER,
GEO. E. FRECH.